(12) United States Patent  (10) Patent No.: US 7,825,612 B2
Lee  (45) Date of Patent: Nov. 2, 2010

(54) LIGHT EMITTING DIODE ARRAY DRIVING APPARATUS

(75) Inventor: Sang Yun Lee, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 351 days.

(21) Appl. No.: 12/120,079

(22) Filed: May 13, 2008

(65) Prior Publication Data

US 2008/0284346 A1 Nov. 20, 2008

(30) Foreign Application Priority Data

May 18, 2007 (KR) .................. 10-2007-0048665

(51) Int. Cl.
*H05B 37/02* (2006.01)

(52) U.S. Cl. .................. 315/308; 315/209 R; 315/246; 315/250

(58) Field of Classification Search ............. 315/209 R, 315/210, 246, 250, 291, 307, 308

See application file for complete search history.

(56) References Cited

U.S. PATENT DOCUMENTS

| | | | |
|---|---|---|---|
| 7,423,389 B2 * | 9/2008 | Lee | 315/308 |
| 7,557,520 B2 * | 7/2009 | Chen et al. | 315/291 |
| 2004/0170037 A1 | 9/2004 | Bucks et al. | |

2009/0273290 A1 * 11/2009 Ziegenfuss .................. 315/193

FOREIGN PATENT DOCUMENTS

| JP | 2004536434 A | 12/2004 |
|---|---|---|
| JP | 2006210835 A | 8/2006 |
| JP | 2007005326 A | 1/2007 |

OTHER PUBLICATIONS

Japanese Office Action for application No. 2008-130170, issued Aug. 2, 2010.

* cited by examiner

*Primary Examiner*—Thuy Vinh Tran
(74) *Attorney, Agent, or Firm*—Lowe Hauptman Ham & Berner, LLP

(57) ABSTRACT

There is provided a LED array driving apparatus for driving a light emitting array having a plurality of LEDs connected to one another, including: a DC-DC converting part; a current/voltage detecting part detecting a magnitude of a first current flowing through a switching transistor of the DC-DC current converting part to correspondingly output a first current detection voltage, detecting a magnitude of a both-end voltage of the LED array to correspondingly output a LED array detection voltage, and detecting a magnitude of a current flowing through the LED array to correspondingly output a second current detection voltage; and a constant current controlling part controlling an on/off duty of the switching transistor according to the magnitude of the first current detection voltage, the second current detection voltage and the LED array detection voltage detected by the current/voltage detecting part.

6 Claims, 3 Drawing Sheets

LIGHT EMITTING DIODE ARRAY DRIVING APPARATUS

CROSS-REFERENCE TO RELATED APPLICATIONS

This application claims the priority of Korean Patent Application No. 2007-48665 filed on May 18, 2007, in the Korean Intellectual Property Office, the disclosure of which is incorporated herein by reference.

BACKGROUND OF THE INVENTION

1. Field of the Invention

The present invention relates to a light emitting diode (LED) array driving apparatus, and more particularly, to an LED array driving apparatus employing a single ended primary inductance converter (SEPIC) type of a direct current-direct current (DC-DC) converting part and capable of protecting an LED and a driving circuit from an overvoltage applied to the LED and controlling a duty of an output signal of a pulse width modulation integrated circuit (PWM IC) to be 0%.

2. Description of the Related Art

A cold cathode fluorescent lamp (CCFL) used as a light source of a conventional liquid crystal display (LCD) employs mercury gas, which may trigger environmental pollution. Besides, the CCFL is slow in response rate, low in color reproducibility and inappropriate for a smaller-sized and lighter-weight liquid crystal display (LCD) panel.

In contrast, a light emitting diode (LED) is environment-friendly, high in response rate with several nano seconds, thus effective for a video signal stream and capable of being impulsively driven. Moreover, the LED can reproduce color by 100% and alter brightness and color temperature by adjusting light amount of red, green and blue LEDs. Also, the LED carries advantages suitable for the smaller-sized and lighter-weight LCD panel. Therefore, of late, the LED has been actively employed as a backlight source of the LCD panel.

As described above, in a case where an LED array having a plurality of LEDs connected to one another is utilized in the liquid crystal display (LCD) backlight employing the LED, a driving circuit for driving the LED array requires a direct current-direct current (DC-DC) converter converting an input voltage inputted from the outside into a voltage suitable for driving the LED array, and a driving circuit supplying a predetermined constant current to the LED array. Moreover, the LED array driving circuit additionally requires a dimming circuit which enables a user to adjust brightness and color temperature arbitrarily or adjust brightness of the LEDs for e.g., temperature compensation.

Particularly, the DC-DC converter applied to a conventional LED array driving apparatus is formed of a boost-type DC-DC converter which increases an input voltage level to output or a buck-type DC-DC converter which decreases an input voltage level to output. Therefore, when the LED array driving apparatus is applied to an application apparatus having input voltages different from each other, or a voltage for driving the LEDs is changed in magnitude, the LED array driving apparatus cannot be applied as such.

SUMMARY OF THE INVENTION

An aspect of the present invention provides a light emitting diode (LED) array driving apparatus applicable to any case where a driving voltage level of an LED array is higher or lower than an input voltage level.

An aspect of the present invention also provides an LED array driving apparatus capable of safely protecting a driving circuit from an overvoltage applied to the LED array while being applicable to any case where a driving voltage level of an LED array is higher or lower than an input voltage level.

An aspect of the present invention also provides an LED array driving apparatus capable of controlling dimming of the LED array through an external dimming control signal and turning off the LED array completely by dimming control.

According to an aspect of the present invention, there is provided an LED array driving apparatus for driving a light emitting array having a plurality of LEDs connected to one another, including: a direct current-direct current converting part including: a first inductor having an input voltage applied to one end thereof; a first capacitor having one end connected to another end of the first inductor; a switching transistor having a drain connected to a connecting node between the first inductor and the first capacitor; a first diode having an anode connected to another end of the first capacitor and a cathode connected to the light emitting array; a second inductor having one end connected to a connecting node between the first capacitor and the first diode; and a second capacitor having one end connected to a connecting node between the first diode and the LED array; a current/voltage detecting part detecting a magnitude of a first current flowing through the switching transistor to correspondingly output a first current detection voltage, detecting a magnitude of a voltage of a both-end voltage of the LED array to correspondingly output an LED array detection voltage, and detecting a magnitude of a current flowing through the LED array to correspondingly output a second current detection voltage; and a constant current controlling part controlling an on/off duty of the switching transistor according to the magnitude of the first current detection voltage, the second current detection voltage and the LED array detection voltage detected by the current/voltage detecting part.

The current/voltage detecting part may include: a plurality of voltage detection resistors connected to one another in series and connected in parallel to the LED array; a first current detection resistor connected between a source of the switching transistor and a ground; and a second current detection resistor connected between the LED array and the ground.

The constant current controlling part may include: a pulse width modulation integrated circuit (PWM IC) operating in response to a power voltage, the PWM IC including: an RT/CT terminal generating and outputting a sawtooth wave voltage of a predetermined frequency; a COMP terminal receiving a comparison voltage to be compared with the sawtooth wave voltage; and an output terminal generating and outputting a pulse signal, the pulse signal turned off at an interval where the sawtooth wave voltage has a level higher than a level of the comparison voltage and turned on at an interval where the sawtooth wave voltage has the level lower than the level of the comparison voltage; a voltage comparator comparing the LED array detection voltage with a preset reference voltage and outputting a first error voltage equivalent to a difference therebetween; and a comparison voltage setter setting the comparison voltage inputted to the COMP terminal of the PWM IC to substantially zero when the first error voltage is a predetermined level or less.

The voltage comparator may include a first operational amplifier receiving the detection voltage through an inverse input terminal and receiving the reference voltage through a non-inverse input terminal to output an error voltage equivalent to a difference between the inverse input terminal and the non-inverse input terminal.

The comparison voltage setter may include: a second diode having a cathode connected to an output terminal of the first operational amplifier; a resistor having one end connected to the power voltage and another end connected to an anode of the second diode; a second operational amplifier having a non-inverse input terminal connected to the anode of the second diode and the non-inverse input terminal electrically connected to an output terminal thereof to thereby have an output level identical to an input voltage of the non-inverse input terminal; and a PNP transistor having a base connected to the output terminal of the second operational amplifier, an emitter connected to the COMP terminal of the PWM IC and a collector connected to the ground.

The constant current controlling part may further include a third operational amplifier receiving a voltage level equivalent to at least one of a pulse amplitude modulation (PAM) dimming signal and a pulse width modulation (PWM) dimming signal inputted from the outside through the non-inverse input terminal, receiving the second current detection voltage through the inverse input terminal and comparing levels of the voltages inputted to the non-inverse input terminal and the inverse input terminal to thereby output a second error voltage equivalent to a difference therebetween to an output terminal, and the comparison voltage setter includes a third diode having a cathode connected to the output terminal of the third operational amplifier and an anode connected to the anode of the second diode.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
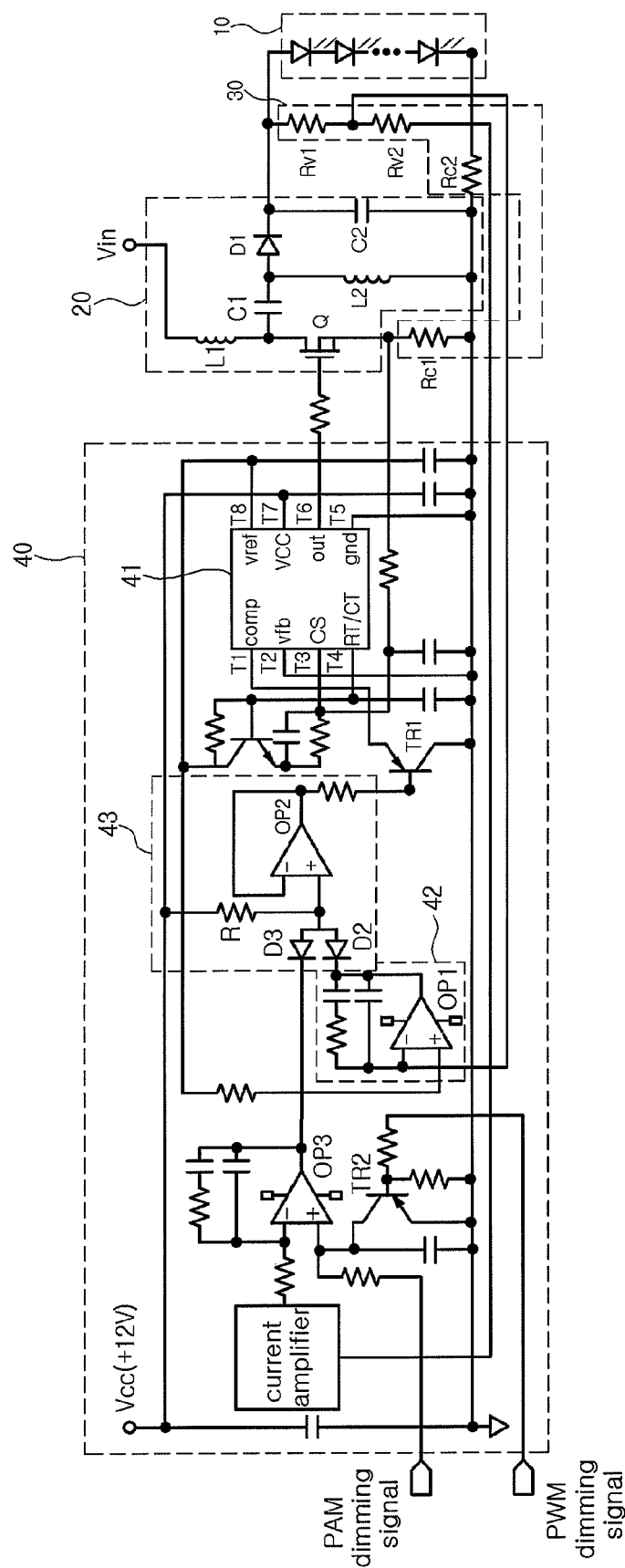
FIG. 1 is a circuit diagram illustrating a light emitting diode (LED) array driving apparatus according to an exemplary embodiment of the invention.

Exemplary embodiments of the present invention will now be described in detail with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference signs are used to designate or similar components throughout.

FIG. 1 is a circuit diagram illustrating a light emitting diode (LED) array driving apparatus according to an exemplary embodiment of the invention.

Referring to FIG. 1, the LED array driving apparatus of the present embodiment includes a direct current-direct current (DC-DC) converting part 20, a current/voltage detecting part 30 and a constant current controlling part 40. The direct current-direct current (DC-DC) converting part 20 converts an input voltage into a voltage appropriate for driving an LED array 10. The current/voltage detecting part 30 detects a voltage between two ends, i.e., both-end voltage of the LED array 10, a current flowing through the LED array 10 and a current flowing through a switch of the DC-DC converting part 20. The constant current controller 40 maintains magnitude of the current supplied from the LED array 10 constantly according to current and/or voltage detected by the current/voltage detecting part 30.

The LED array 10 includes a plurality of light emitting diodes electrically connected to one another in various configurations such as in series, in parallel and in serial-parallel combination. Typically, when used as a light source of an LCD backlight for producing white light, each of LED arrays may have LEDs emitting light of the same color electrically connected to one another. The each LED array may include a separately-driven driving apparatus.

The DC-DC converting part 20 converts an input voltage Vin into a different magnitude of voltage to supply to the LED array 10. The DC-DC converting part 20 of the present invention is formed of a single ended primary inductance converter (SEPIC). The SEPIC is known to convert a high DC voltage into a low DC voltage and a low DC voltage into a high DC voltage by controlling an on/off duty of a switch.

The SEPIC-type DC-DC converting part 20 of the present invention includes a first inductor L1 having an input voltage Vin applied to one end thereof, a first capacitor C1 having one end connected to another end of the first inductor L1, a switching transistor Q having a drain connected to a connecting node between the first inductor L1 and the first capacitor C1, a first diode D1 having an anode connected to another end of the first capacitor C1 and a cathode connected to the light emitting array, a second inductor having one end connected to a connecting node between the first capacitor C1 and the first diode D1, and a second capacitor having one end connected to a connecting node between the first diode D1 and the light emitting diode array 10.

Hereinafter, operation of the SEPIC-type DC-DC converting part 20 will be described briefly.

The SEPIC-type DC-DC converting part 20 operates in a continuous mode when a current flowing through the first inductor L1 is not zero. When the SEPIC-type DC-DC converting part is in steady state, the first capacitor C1 has an average voltage identical to the input voltage Vin. The first capacitor C1 blocks a direct current (DC) and thus an average current flowing through the first capacitor C1 is zero. Since the average current flowing through the first capacitor C1 is zero, the only supply source of an average load current, i.e., current flowing through the LED array 10 is a current flowing through the second inductor L2. Therefore, an average current of the second inductor L2 is identical to a load current, and not affected by the input voltage.

In terms of the average voltage, the input voltage Vin is a total sum of the voltage of the first inductor L1, the voltage of the first capacitor C1, and the voltage of the second inductor L2, as represented by $Vin=V_{L1}+V_{C1}+V_{L2}$. Here, the average voltage of the first capacitor C1 is equal to the input voltage Vin, and thus the voltage of the first inductor L1 and the voltage of the second inductor L2 are of an identical magnitude having different polarities, as represented by $V_{L1}=-V_{L2}$. Consequently, the inductors can be wound around an identical core. Such voltages of an identical magnitude, when the inductors are to be wound with appropriate polarities, may allow for zero mutual inductance. Also, the voltages of an identical magnitude ensure ripple currents of an identical magnitude to be supplied from both the inductors.

Moreover, in terms of the average current, a current flowing through the first diode D1 is equal to a difference between a current of the first inductor L1 and a current of the second inductor L2, as represented by $I_{D1}=I_{L1}-I_{L2}$. When the switching transistor Q is turned on, the current flowing through the first inductor L1 is increased and the current flowing through the second inductor L2 is decreased, i.e., becomes more negative. An energy increasing the current flowing through the first inductor L1 comes from an input power source. The switching transistor Q is turned on and the first capacitor C1 temporarily has a voltage substantially equal to the input voltage Vin, thereby allowing the voltage of the second inductor L2 to be substantially negative, i.e., −Vin. Therefore, the first capacitor C1 provides energy to further reduce the current flowing through the second inductor L2, that is, to ensure a greater negative value. When the switching transistor Q is turned off, the current of the first inductor L1 is identical to the current of the first capacitor C1. Moreover, the inductors do not allow a temporary change in the current and thus the current of the second inductor L2 continuously becomes more negative. By Kirchhoff's law, the current flowing to the diode D is equal to a difference between the current of the first capacitor C1 and the current of the second inductor L2. Consequently, when the switching transistor Q is turned off, power is transferred from the first inductor L1 and the second inductor L2 to a load. When the switching transistor Q is turned off, the first capacitor C1 is charged by the first inductor L1. Subsequently, when the switching transistor W is turned on, the first capacitor C1 charges the second inductor L2.

The SEPIC-type DC-DC converting part 20 may perform boost and buck functions by virtue of the first capacitor C1 and the second capacitor L2. The first inductor L1 and the switching transistor Q constitute a general boost type converter. The boost type converter generates a voltage higher than the input voltage Vin and has a magnitude determined by a duty ratio of the switching transistor Q. The first capacitor C1 has an average voltage identical to the input voltage Vin and accordingly an output voltage, i.e., voltage on the load is equal to a difference between a voltage Vq between a drain and a source of the switching transistor Q and the input voltage Vin. Therefore, when the voltage Vq between the drain and source of the switching transistor Q is two times smaller than the input voltage Vin, the output voltage is smaller than the input voltage. Meanwhile, when the voltage Vq between the drain and source of the switching transistor Q is two times greater than the input voltage Vin, the output voltage surpasses the input voltage Vin.

As described above, the DC-DC converting part of the present embodiment may increase or decrease a level of the input voltage Vin depending on magnitude of the input voltage Vin.

The current/voltage detecting part 30 detects a current flowing through the switching transistor Q of the DC-DC converting part 20, a voltage applied to the LED array 10 and a current flowing through the LED array 10 to output a corresponding detection current, respectively.

Specifically, the current/voltage detecting part 30 may include a plurality of voltage detection resistors Rv1 and Rv2 connected in series to each other and connected in parallel to the LED array 10, a first current detection resistor Rc1 connected between a source of the switching transistor Q and a ground, and a second current detection resistor Rc2 connected between the LED array 10 and the ground.

The voltage detection resistors Rv1 and Rv2 are connected in series to each other and connected in parallel to the LED array 10, and output a voltage at a connecting node between the voltage detection resistors Rv1 and Rv2 as an LED array detection voltage. Moreover, a voltage at a connecting node between the first current detection resistor Rc1 and a source of the switching transistor Q is a first current detection voltage and a voltage at a connecting node between the second current detection resistor Rc2 and the LED array 10 is a second current detection voltage.

The constant current controlling part 40 operates in response to a power voltage Vcc and includes an PWM IC 41, a voltage comparator 42 and a comparison voltage setter 43. The PWM IC 41 includes an RT/CT terminal T4 generating and outputting a sawtooth wave voltage of a predetermined frequency, a COMP terminal T1 receiving a comparison voltage to be compared with the sawtooth wave voltage, and an output terminal T6 generating and outputting a pulse signal which is turned off at an interval where the sawtooth voltage has a level higher than a level of the comparison voltage and turned on at an interval where the sawtooth voltage has the level lower than the level of the comparison voltage. The voltage comparator 42 compares the LED array detection voltage with a preset reference voltage and outputs a first error voltage equivalent to a difference therebetween. The comparison voltage setter 43 sets the comparison voltage inputted to the COMP terminal T1 of the PWM IC 41 to substantially zero when the first error voltage is a predetermined level or less.

Figure 2:
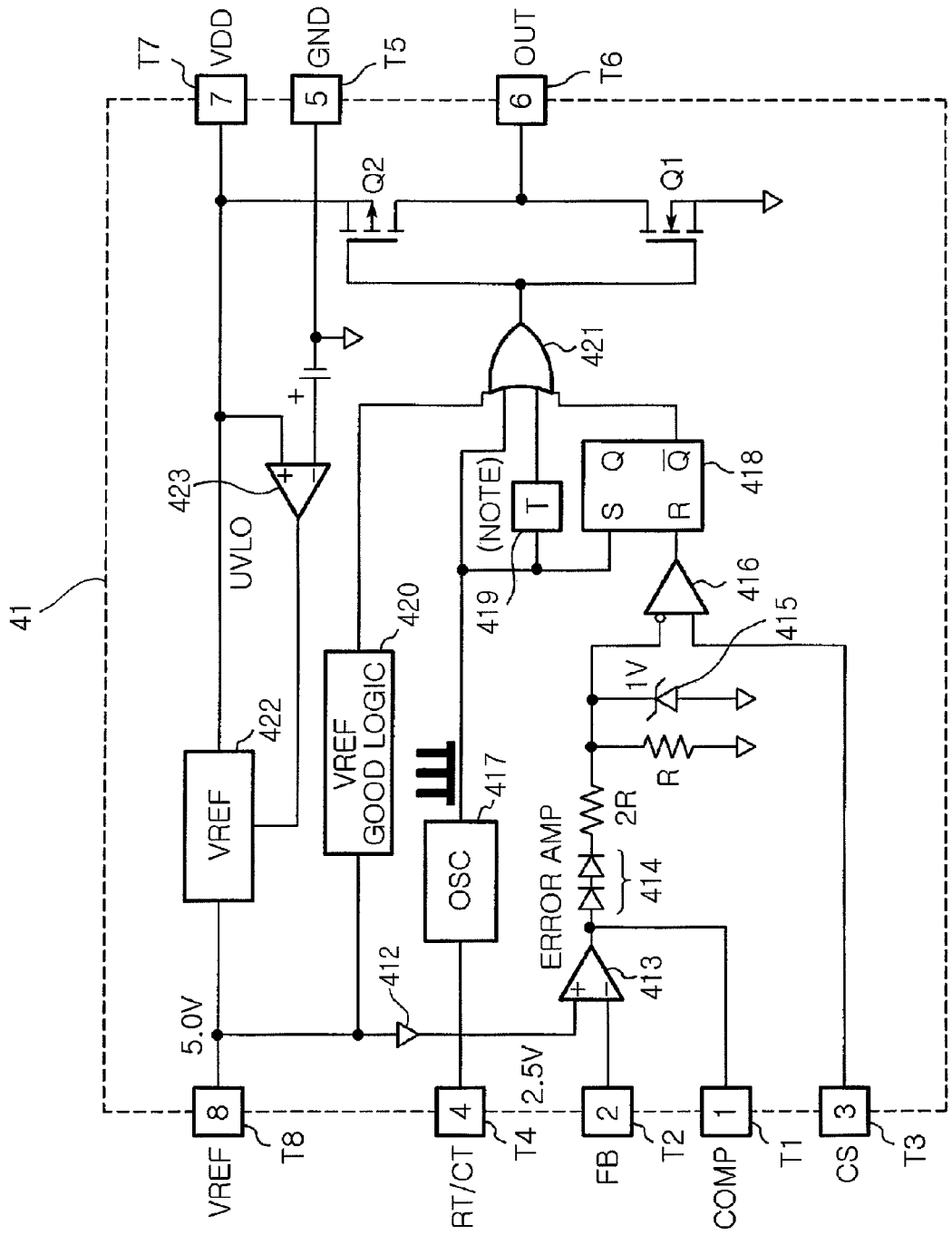
FIG. 2 is an internal circuit diagram illustrating a pulse width modulation integrated circuit (PWM IC) applied to the present invention.

The PWM IC 41 may be formed of a general current mode PWM driving IC. FIG. 2 schematically illustrates an internal circuit structure of a general current mode PWM driving IC applied to the present invention. Referring to FIG. 2, the PWM IC 41 includes an error amplifier 413, a comparator 416, an oscillator 417, logic circuits 418, 419 and 421 and transistors Q1 and Q2. The error amplifier 413 compares a reference voltage Vref with a feedback voltage to obtain a difference therebetween. The comparator 416 compares an output signal of the error amplifier 413 with a sensing voltage. The oscillator 417 generates a reference clock. The logic circuits 418, 419 and 421 each compare the comparison signal with the output signal from the oscillator 417 to determine an on/off interval of switching pulse. The transistors Q1 and Q2 each operate in response to output signals of the logic circuits 418, 419 and 421, and output a preset high level voltage 5V at an ON interval and a preset low level 0V voltage at an OFF interval. Also, the PWM IC 41 includes input and output terminals including a COMP terminal T1 receiving a comparison result, an FB terminal T2 receiving a feedback voltage, a CS terminal T3 receiving the current detection voltage, i.e., a voltage applied to Rc1 of FIG. 1, an RT/CT terminal T4 outputting a sawtooth wave signal as a reference frequency signal, a GND terminal T5 connected to the ground, an OUT terminal T6 outputting a duty-controlled switching pulse, a Vcc terminal T7 having a power voltage applied thereto and a Vref terminal T8 having a reference voltage applied thereto.

Basically, the PWM IC 41 has the first current detection voltage outputted by a first current detection resistor Rc1 of the current/voltage detecting part 30 fed back to the CS terminal T3 and determines a duty ratio of the switching pulse outputted to the OUT terminal T6 of the PWM IC depending on change in magnitude of the current detection voltage. Through this operation, the PWM IC 41 can control an on/off duty ratio of the switching transistor Q and control a current to be supplied to the LED array 10 at a constant level, that is, enables constant current control.

Figure 3:
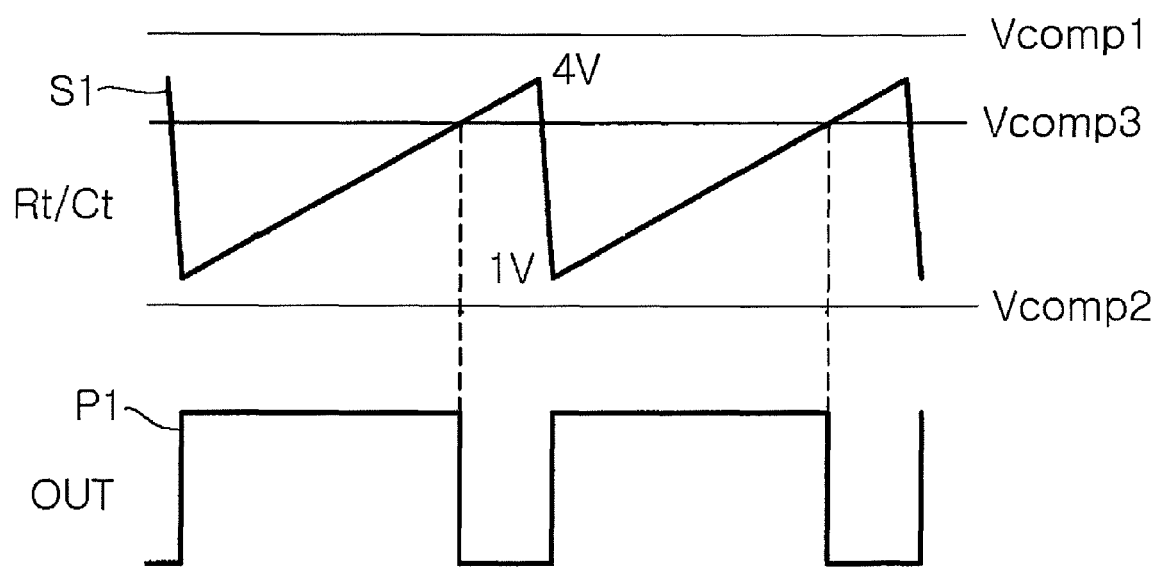
FIG. 3 is a waveform diagram illustrating a sawtooth wave of an RT/CT terminal and an input level of a COMP terminal for explaining a method of controlling a duty of an LED array driving apparatus according to an exemplary embodiment of the invention.

In addition, the PWM IC 41 of the present embodiment adjusts an output duty of the PWM IC 41 to be 0% depending on the sawtooth wave voltage of a predetermined frequency outputted from the RT/CT terminal T4 and the comparison voltage inputted to the COMP terminal T1. That is, the PWM IC shown in FIG. 3 operates in response to the power voltage Vcc, and includes an RT/CT terminal T4, a COMP terminal T1 and an output terminal T6. The RT/CT terminal T4 generates and outputs a sawtooth wave voltage of a predetermined frequency. The COMP terminal T1 receives a comparison voltage to be compared with the sawtooth wave voltage. The output terminal T6 generates and outputs a pulse signal which is turned off at an interval where the sawtooth wave voltage has a level higher than a level of the comparison voltage and turned on at an interval where the sawtooth wave voltage has the level lower than the level of the comparison voltage. FIG. 3 is a waveform diagram illustrating a sawtooth wave of an RT/CT terminal and an input level of a COMP terminal for explaining a method of controlling a duty of the LED driving apparatus according to an exemplary embodiment of the invention.

Referring to FIG. 3, a sawtooth wave voltage S1 of a predetermined frequency outputted from the RT/CT terminal T4 of the PWM IC 41 is shaped as a sawtooth wave and valued at 1V to 4V. The sawtooth wave voltage S1 is compared with a level of each of the comparison voltages Vcomp1 to Vcomp3 inputted to the COMP terminal T1. The PWM IC 41 generates a pulse signal P1 which is turned off at an interval where the sawtooth wave voltage S1 has a level higher than a level of the comparison voltage Vcomp1 to vcomp3 and turned on at an interval where the sawtooth voltage has the level lower than the level of the comparison voltage, and outputs the pulse signal P1 to the output terminal T6. Therefore, when the level of the comparison voltage inputted to the COMP terminal T1 is greater than an upper limit of the sawtooth wave voltage S1, that is, in the case of Vcomp 1, the signal outputted to the output terminal T6 has a 100% duty which is in an ON state all the time. In a case where the level of the comparison voltage is greater than a lower limit of the sawtooth wave voltage S1, that is, in the case of Vcomp2, the signal outputted to the output terminal T6 has a 0% duty which is in an OFF state all the time. Meanwhile, in a case where the level of the comparison voltage is between an upper limit and a lower limit of the sawtooth wave voltage S1, that is, in the case of Vcomp3, a pulse signal P1 having an on-off repeated periodically is outputted. According to the present embodiment, when an overvoltage is applied or the LED array is to be turned off through an external dimming control signal, the voltage applied to the COMP terminal T1 is reduced to 1V or less, thereby controlling a pulse duty of the output terminal of the PWM IC 41 to be 0%.

The voltage comparator 42 compares the LED array detection voltage outputted from the current/voltage detecting part 30 with the preset reference voltage to output a first error voltage equivalent to a difference therebetween. The voltage comparator 25 may include a first operational (OP) amplifier OP1 receiving the LED array detection voltage through the inverse input terminal, and the reference voltage through the non-inverse input terminal to output an error voltage equivalent to a difference therebetween. The first operational amplifier OP1 operates as an error amplifier.

When the error voltage outputted from the first operational amplifier OP1 is a predetermined level or less, the comparison voltage setter 43 sets the comparison voltage inputted to the COMP terminal T1 of the PWM IC 41 to substantially 0V. Specifically, the comparison voltage setter 43 includes a second diode D2, a resistor R, a second operational amplifier OP2 and a PNP transistor TR1. The second diode D2 has a cathode connected to an output terminal of the first operational amplifier OP1. The resistor R has one end connected to the power voltage Vcc and another end connected an anode of the second diode D2. The second Operational amplifier OP2 has a non-inverse input terminal connected to the anode of the second diode D2 and electrically connected to an output terminal thereof to thereby have an output terminal level identical to an input voltage of the non-inverse input terminal. The PNP transistor TR1 has a base connected to the output terminal of the second operational amplifier OP2, an emitter connected to the COMP terminal T1 of the PWM IC 41 and a collector connected to the ground.

In addition to the configuration described above, the present embodiment may further include a third operational amplifier OP3 receiving a voltage level equivalent to at least one of a pulse amplitude modulation dimming (PAM) signal DS1 and a pulse width modulation dimming (PWM) signal DS2 inputted from the outside through the non-inverse input terminal, receiving the second current detection voltage equivalent to the current flowing through the LED array 10 through the inverse input terminal, and comparing levels of the voltages inputted to the non-inverse input terminal and the inverse input terminal to thereby output a second error voltage equivalent to a difference therebetween to an output terminal. Here, the comparison voltage setter 43 may further include a third diode D3 having a cathode connected to the output terminal of the third operational amplifier OP3 and an anode connected to the anode of the first diode D1.

Hereinafter, operational effects of the present invention will be described with reference to FIG. 1.

In an LED array driving apparatus of the present invention, when an overvoltage is applied to an LED array utilized as a load, a circuit can be protected from the overvoltage and PWM IC is duty-controlled to completely block a current supplied to the LED by a dimming signal inputted from the outside.

First, operations for protecting the overvoltage will be described.

The present embodiment employs an overvoltage protection circuit to overcome a problem associated with the overvoltage that may be applied when the load is open. In the present embodiment, first, in a case where the load is open, that is, LEDs arranged in connection with one another in the LED array 10, are disconnected, the current/voltage detecting part 30 detects the LED array detection voltage equivalent to a voltage between two ends, i.e., both-end voltage of the LED array 10 to protect the LED array 10 from the overvoltage applied thereto. As shown in FIG. 1, the LED array detection voltage may be a voltage divided by resistance of the resistors Rv1 and Rv2 which are connected in series to each other.

The LED array detection voltage is compared with a reference voltage inputted to the inverse input terminal of the first Operational amplifier of the voltage comparator 42 and to the non-inverse input terminal of the first operational amplifier OP1 and then a value equivalent to a difference therebetween is outputted. In a case where an overvoltage is applied, an output level of the first Operational amplifier OP1 is decreased to substantially 0V and in turn, a current flows from the power source Vcc through the second diode D2. This accordingly allows a lower voltage level to be applied to the non-inverse terminal of the second OP amp OP2 of the comparison voltage setter 43. Here, the second Operational amplifier OP2 has the inverse input terminal and the output terminal electrically connected to each other so as to perform a buffer function as an impedance conversion circuit having a gain of 1 and amplifying a current. Therefore, the output terminal of the second Operational amplifier OP2 has a voltage level identical to an input voltage level of the non-inverse input terminal.

That is, when an overvoltage is applied to the LED array 10, an output level of the first Operational amplifier OP1 is reduced to substantially 0V and in turn a current flows to the power source Vcc through the second diode D2. This accordingly decreases a voltage level applied to the non-inverse terminal of the second Operational amplifier OP2 serving as a buffer and also a voltage level of the output terminal. Accordingly, a base terminal of the PNP transistor TR1 connected to the output terminal of the second Operational amplifier OP2 has a voltage level decreased to turn the PNP transistor TR1 on. This allows a COMP terminal T1 of the PWM IC 41 connected to the emitter to have a voltage of substantially zero. Therefore, the output terminal T6 of the PWM IC 41 outputs a pulse having a duty of 0%, thereby blocking the current from being supplied to the LED array 10.

Next, a description will be given of an operation of controlling a duty of the PWM IC to completely block the current supplied to the LED by the dimming control signal inputted from the outside.

In the same manner as an operation of protecting the overvoltage, to completely block the current supplied to the LED array by an external dimming control signal, the PNP transistor TR1 is decreased in a base voltage to be turned on. Accordingly, an emitter voltage, i.e., a voltage of the COMP terminal T1 of the PWM IC 41 should be equal to or less than a lower limit 1V of a sawtooth wave voltage of the RT/CT terminal T4.

Meanwhile, external dimming control signals DS1 and DS2 are compared with a corresponding voltage level and a second current detection voltage equivalent to the current flowing through the LED array 10 which are inputted to the non-inverse input terminal and the inverse input terminal of the third OP amp OP3, respectively. First, the PAM dimming signal DS1 is applied to the non-inverse terminal of the third Operational amplifier OP3 as a direct current from the outside, and the current flowing through the cathode of the LED array 21 is detected to allow an amplified signal level to be inputted to the non-inverse terminal of the third Operational amplifier OP3. When the PAM dimming signal DS1 is decreased, the third Operational amplifier OP3 is decreased in an output level. Next, in the same manner, the PWM dimming signal of a pulse shape is converted by the NPN transistor TR2 and applied to the non-inverse terminal. With decrease in the duty of the PWM dimming control signal DS2, the third Operational amplifier OP3 is decreased in the output level.

Therefore, in the same manner as the operation of the overvoltage protection circuit described above, the current flows from the power source Vcc through the third diode D3, thereby reducing a level of a voltage applied to the non-inverse terminal of the second Operational amplifier OP2 acting as a buffer and accordingly a level of the output terminal thereof. This consequently reduces a voltage level of the base terminal of the PNP transistor TR1 connected to the output terminal of the second Operational amplifier OP2. In turn, the PNP transistor TR1 is turned on to allow the COMP terminal T1 of the PWM IC 41 connected to the emitter to be substantially 0V. Accordingly, a pulse of the output terminal T6 of the PWM IC 41 has a zero % duty to thereby block current supplied to the LED array 10.

In the circuit of the present embodiment described above, the first and third Operational amplifiers OP1 and OP3 have respective outputs inputted to the non-inverse input terminal of the second Operational amplifier OP2 through the second and third diodes D2 and D3. Here, the diode voltages are lowered due to the first and second diodes D1 and D2 and thus a resistor R with a great resistance is inserted between the non-inverse input terminal of the second Operational amplifier OP2 and the power source to enhance impendence, and a current flowing through the resistor R is amplified through the impedance conversion circuit, i.e., second Operational amplifier OP2.

As a result, low voltages equivalent to voltage decreases of the second and third diodes D2 and D3 are applied to the base of the PNP transistor TR1, and the amplified current by the second Operational amplifier OP2 is inputted thereto to ensure conduction of the PNP transistor RT1. In turn, the COMP terminal T1 of the PWM IC 41 has a voltage of substantially 0V and the pulse of the output terminal T6 of the PWM IC 41 has a duty of 0%, thereby blocking current supplied to the LED array.

In addition, a low current flows through the resistor R3 to the output terminals of the first and third Operational amplifiers OP1 and OP3. This increases a response rate of the first and third Operational amplifiers OP1 and OP3 to allow fast change in dimming due to an external dimming control signal and ensure speedy operation of an overvoltage protection circuit, thereby protecting a driving circuit safely.

As set forth above, according to exemplary embodiments of the invention, an SEPIC type DC-DC converter is employed to drive all LED arrays in any case where an input voltage is greater or smaller than a driving voltage of an LED array.

Also, a driving circuit can be protected safely from an overvoltage applied to the LED array.

In addition, in a case where the LED array is turned off through an external dimming control signal, an output signal of a PWM IC is generated to have a duty of complete 0%. This prevents power waste resulting from residual lighting.

While the present invention has been shown and described in connection with the exemplary embodiments, it will be apparent to those skilled in the art that modifications and variations can be made without departing from the spirit and scope of the invention as defined by the appended claims.

What is claimed is:

1. A light emitting diode array driving apparatus for driving a light emitting array having a plurality of light emitting diodes connected to one another, comprising:
    a direct current-direct current converting part comprising:
        a first inductor having an input voltage applied to one end thereof;
        a first capacitor having one end connected to another end of the first inductor;
        a switching transistor having a drain connected to a connecting node between the first inductor and the first capacitor;
        a first diode having an anode connected to another end of the first capacitor and a cathode connected to the light emitting array;
        a second inductor having one end connected to a connecting node between the first capacitor and the first diode; and
        a second capacitor having one end connected to a connecting node between the first diode and the light emitting diode array;
    a current/voltage detecting part detecting a magnitude of a first current flowing through the switching transistor to correspondingly output a first current detection voltage, detecting a magnitude of a both-end voltage of the light emitting diode array to correspondingly output a light emitting diode array detection voltage, and detecting a magnitude of a current flowing through the light emitting diode array to correspondingly output a second current detection voltage; and a constant current controlling part controlling an on/off duty of the switching transistor according to the magnitude of the first current detection voltage, the second current detection voltage and the light emitting diode array detection voltage detected by the current/voltage detecting part.

2. The light emitting diode array driving apparatus of claim 1, wherein the current/voltage detecting part comprises:

a plurality of voltage detection resistors connected to one another in series and connected in parallel to the light emitting diode array;

a first current detection resistor connected between a source of the switching transistor and a ground; and a second current detection resistor connected between the light emitting diode array and the ground.

3. The light emitting diode array driving apparatus of claim 1, wherein the constant current controlling part comprises:

a pulse width modulation integrated circuit operating in response to a power voltage, the pulse width modulation integrated circuit comprising:

an RT/CT terminal generating and outputting a sawtooth wave voltage of a predetermined frequency;

a COMP terminal receiving a comparison voltage to be compared with the sawtooth wave voltage; and an output terminal generating and outputting a pulse signal, the pulse signal turned off at an interval where the sawtooth wave voltage has a level higher than a level of the comparison voltage and turned on at an interval where the sawtooth wave voltage has the level lower than the level of the comparison voltage;

a voltage comparator comparing the light emitting diode array detection voltage with a preset reference voltage and outputting a first error voltage equivalent to a difference therebetween; and a comparison voltage setter setting the comparison voltage inputted to the COMP terminal of the pulse width modulation integrated circuit to substantially zero when the first error voltage is a predetermined level or less.

4. The light emitting diode array driving apparatus of claim 3, wherein the voltage comparator comprises a first operational amplifier receiving the detection voltage through an inverse input terminal and receiving the reference voltage through a non-inverse input terminal to output an error voltage equivalent to a difference between the inverse input terminal and the non-inverse input terminal.

5. The light emitting diode array driving apparatus of claim 4, wherein the comparison voltage setter comprises:

a second diode having a cathode connected to an output terminal of the first operational amplifier;

a resistor having one end connected to the power voltage and another end connected to an anode of the second diode;

a second operational amplifier having a non-inverse input terminal connected to the anode of the second diode and the non-inverse input terminal electrically connected to an output terminal thereof to thereby have an output level identical to an input voltage of the non-inverse input terminal; and a PNP transistor having a base connected to the output terminal of the second operational amplifier, an emitter connected to the COMP terminal of the pulse width modulation integrated circuit and a collector connected to the ground.

6. The light emitting diode array driving apparatus of claim 5, wherein the constant current controlling part further comprises a third operational amplifier receiving a voltage level equivalent to at least one of a pulse amplitude modulation dimming signal and a pulse width modulation dimming signal inputted from the outside through the non-inverse input terminal, receiving the second current detection voltage through the inverse input terminal and comparing levels of the voltages inputted to the non-inverse input terminal and the inverse input terminal to thereby output a second error voltage equivalent to a difference therebetween to an output terminal, and the comparison voltage setter comprises a third diode having a cathode connected to the output terminal of the third operational amplifier and an anode connected to the anode of the second diode.

* * * * *